United States Patent
Rajic et al.

(10) Patent No.: US 6,385,363 B1
(45) Date of Patent: May 7, 2002

(54) PHOTO-INDUCED MICRO-MECHANICAL OPTICAL SWITCH

(75) Inventors: Slobodan Rajic; Panagiotis George Datskos, both of Knoxville; Charles M. Egert, deceased, late of Oak Ridge, all of TN (US), by Mary Beth Egert, legal representative

(73) Assignee: U.T. Battelle LLC, Oak Ridge, TN (US)

( * ) Notice: Subject to any disclaimer, the term of this patent is extended or adjusted under 35 U.S.C. 154(b) by 0 days.

(21) Appl. No.: 09/280,039

(22) Filed: Mar. 26, 1999

(51) Int. Cl.$^7$ .................................................. G02B 6/35
(52) U.S. Cl. .................................. 385/16; 385/4; 385/5
(58) Field of Search ........................... 385/16, 14, 4, 385/5, 13, 38; 359/209, 291, 299

(56) References Cited

U.S. PATENT DOCUMENTS

| | | | |
|---|---|---|---|
| 4,204,742 A | * 5/1980 | Johnson et al | 385/23 |
| 4,385,798 A | * 5/1983 | Yevick | 385/4 |
| 5,323,636 A | 6/1994 | McGowan et al. | |
| 5,445,008 A | 8/1995 | Wachter et al. | |
| 5,446,811 A | * 8/1995 | Field et al. | 385/23 |
| 5,585,961 A | * 12/1996 | Saitoh et al. | 359/323 |
| 5,719,324 A | 2/1998 | Thundat et al. | |
| 5,841,912 A | 11/1998 | Mueller-Fiedler et al. | |
| 6,014,477 A | * 1/2000 | Barber et al. | 385/16 |

FOREIGN PATENT DOCUMENTS

JP  57-196203 A  * 12/1982

OTHER PUBLICATIONS

Morikawa et al. Position control of PLZT bimorph–type optical actuator by on–off control. 23rd Internat. Conf. on Industrial Electronics, Control, and Instrumentation (IECON '97), vol. 3 pp. 1403–1408, Nov. 1997.*

Datskos et al., *Appl. Phys. Lett.*, 73, 1 (1998) (Oct.) "Photoinduced and thermal stress in silicon microcantilevers".

Thundat et al., *Microscale Thermophysical Engineering*, 1, 185 (1997) (No Month) "Microcantilever sensors".

Thundat et al., *Appliance Manufacturer*, 57, Apr. 1997 "Nanosensor Array Chips".

Wachter et al., *Rev. Sci. Instrum.*, 67, 3434 (1996) (Oct.) "Remote optical detection using microcantilevers".

Barnes et al., *Nature*, 372, 79 (1994) (Nov.) "Photohermal Spectroscopy with femtojoale sensitivity using a micromechanical device".

Gimzewski et al., *Chem. Phys. Lett.*, 217, 589 (1994) (Jan.) "Observation of a chemical reaction using a micromechanical sensor".

Hoh et al., *J. Am. Chem. Soc.*, 114, 4917 (1992) (Jun.) "Quantized Adhesion Detected with the Atomic Force Microscope".

* cited by examiner

Primary Examiner—Rodney Bovernick
Assistant Examiner—Michael Stahl
(74) Attorney, Agent, or Firm—J. Herbert O'Toole; Nexsen Pruet Jacobs & Pollard, LLC

(57) ABSTRACT

An optical switch is formed by introducing light lengthwise to a microcantilever waveguide directed toward a second waveguide. The microcantilever is caused to bend by light emitted from a laser diode orthogonal to the microcantilever and at an energy above the band gap, which induces stress as a result of the generation of free carriers. The bending of the waveguide directs the carrier frequency light to a second receptor waveguide or to a non-responsive surface. The switch may be combined in an array to perform multiple switching functions rapidly and at low energy losses.

11 Claims, 3 Drawing Sheets

PHOTO-INDUCED MICRO-MECHANICAL OPTICAL SWITCH

STATEMENT AS TO RIGHTS TO INVENTIONS MADE UNDER FEDERALLY SPONSORED RESEARCH AND DEVELOPMENT

The U.S. Government has rights in this invention pursuant to contract number DE-AC 05-960R22460 between Lockheed Martin Energy Research Corporation and the Department of Energy.

BACKGROUND OF THE INVENTION

1. Field of the Invention

This invention relates to the field of optical switching. The switching mechanism is a micro-mechanical movement of a cantilever device induced by optical absorption, in a wave guide material, of photons above the energy band gap of the material.

The effect can be used to modulate or switch an optical channel and may be cascaded to form an ultrahighspeed network switch.

2. Background

Micro-mechanical sensors measure physical quantities by utilizing variations in the physical properties of fabricated microstructures. Advances in micro-fabrication techniques have resulted in improved dynamic response, reduced size, high precision, reproduceability and reliability. Micro-mechanical mass-produced cantilevers of various shapes have been used in atomic force microscopes, scanning tunneling microscopes, and for the detection of chemicals (U.S. Pat. Nos. 5,719,324 and 5,445,008), for the detection of physical parameters such as force, acceleration, acoustics, flow rate, viscosity and temperatures [c.f. Thundat et al., *Microscale Thermophysical Devices* 1:185 (1997)] and as a specific infrared spectrometer [c.f. U.S. Pat. No. 5,977,544].

Optical switches present a technical challenge, and equipment available represents a compromise between optical throughput, rejection efficiency, speed, size and cost. For example, see U.S. Pat. No. 5,841,912 which discloses an optical switching device which employs an electrically triggered piezoelectric layer associated with an optical waveguide to switch by generation of an acoustical wave.

BRIEF SUMMARY OF THE INVENTION

It is an object of this invention to provide an optical switch of a very small size for use in micro-miniaturized optical circuits.

It is a further object of this invention to provide an optical switch which can operate at speeds above 1 MHz.

It is another object of this invention to provide an optical switch which does not interfere with the operation of other switches and components of an optical device.

It is a further object of this invention to provide an optical switch which generates minimal heat while in use regardless of the rate of switching.

These and other objects may be achieved by using a micro-mechanical semiconductor beam as a waveguide and using photon-induced stress to direct a beam of light traveling through the waveguide. Photons impinging on the beam generate "free" charge carriers in the beam which causes an increase or decrease in the lattice constant of the semiconductor, thereby causing the beam to bend reversibly.

DETAILED DESCRIPTION OF THE INVENTION

Figure 1:
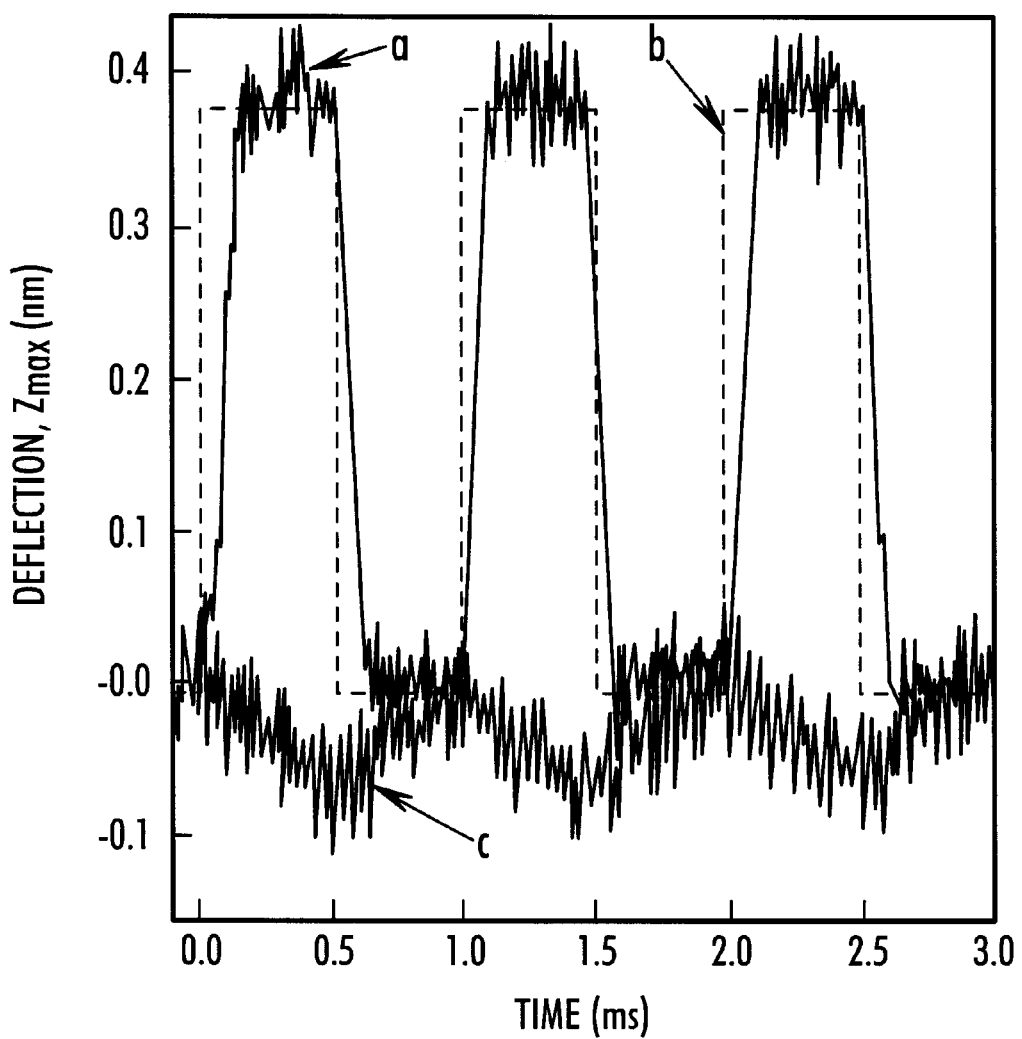
FIG. 1 is a graphical representation of the deflection of a silicon microcantilever exposed to photons at a wave length shorter than the energy cutoff.

Micro-mechanical devices are formed levers or microcantilevers made from silicon and other semiconductor crystalline materials. They can be produced at a high degree of accuracy and reproducibility at ever-decreasing cost using methods of fabrication developed for the semiconductor computer industry.

Typical dimensions for commercially available microcantilevers are 100–200 um long, 20–40 um wide and 0.6 um thick. (Digital Instruments and Park Scientific, both of CA). The cantilevers may be coated on one or both sides by vapor deposition, sputtering, Langmuir-Blodgett film transfer, and other means.

When photons are impinged upon the surface of a microcantilever, several effects may be observed. As a solid, the microcantilever is heated and classical thermal expansion is observed. As a semiconductor, free charge carriers may be generated which also induce a mechanical strain.

For a semiconductor with a band gap energy $\epsilon_g$, the change in total surface stress due to photogenerated excess charge carriers, $\Delta n$, and changes in temperature $\Delta T$, will be the sum of the photoinduced stress, $\Delta s_{pi}$, and thermal stress, $\Delta s_{th}$, given by, $$\Delta s = \Delta s_{pi} + \Delta s_{th} = \left(\frac{1}{3}\frac{d\epsilon_g}{dP}\Delta n\right)E + \alpha\Delta TE, \quad (1)$$

where, $d\epsilon_g/dP$ is the pressure dependence of the band gap energy, $a$ is the thermal expansion coefficient, and E is the Young's modulus. A hole (in the valence band) decreases the energy of covalent bonds while an electron adds to the bonding (or antibonding) energy. Since $d\epsilon_g/dP$ can be either positive or negative there can be a competing effect between the photoinduced and thermal stress. For example, when $d\epsilon_g/dP$ is negative, the photoinduced stress is of opposite sign than that of the thermal stress which will tend to make the semiconductor crystal contract. On the other hand where $d\epsilon_g/dP$ is positive, the photoinduced stress will tend to make the semiconductor crystal expand.

Assuming a semiconductor cantilever of length l, width w, and thickness t, the maximum displacement $z_{max}$ due to photoinduced and thermal stresses is given by $$z_{max} \approx \frac{(1-\upsilon)l^2}{t}\frac{d\epsilon_g}{dP}\Delta n + \frac{3(1-\upsilon)l^2}{t}\alpha\Delta T, \quad (2)$$

where v is the Poisson's ratio. An absorbed power, $\Phi^{abse}_{Td}$ of photons with wave length $\lambda(=hc/e_g)$ will produce a number density of excess charge carriers, $\Delta n$, given by $$\Delta n = \eta\frac{\lambda}{hc}\frac{\tau_L}{lwt}\Phi^{abs}_e, \quad (3)$$

where $\eta$ is the quantum efficiency, h is Planck's constant, c is the speed of light, and $T_L$ is the lifetime of the carriers in the semiconductor. The maximum displacement $z_{max}$ due to photogenerated carrier can then be written as $$z_{max} \approx \frac{(1-\upsilon)l^2}{t}\left(\eta \frac{\lambda}{hc}\frac{d\epsilon_g}{dP}\frac{1}{lwt} + \frac{3\alpha}{mc_p}\right)\tau_L \Phi_e. \quad (4)$$

Since the charge carriers can be generated in a very short time the photoinduced stress can manifest itself much faster than thermal stress. Of course, the overall change in $z_{max}$ will depend on the physical and mechanical properties of the semiconductor. From Eq. (4) we can estimate the relative contribution of the photoinduced stress and thermal stress to the bending of Si ($e_g$=1.12eV) microcantilevers such as the one used in the present studies having length l=100 um, thickness t=0.5 um, and width w=20 um. The amount of photon energy needed to raise the temperature of a mass of Si equal to 2.3×10$^{-9}$ g by 10$^{-5}$ K is $\Phi^{abse}\tau_d$=(Nhv=$c_p$m$\Delta$T=) 1.62×10$^{-14}$ J where $c_p$ for Si is 0.702 Jg$^{-1}$K$^{-1}$. If the photon wavelength is $\lambda$=1.1 um then 8.94×10$^4$ photons will be required. Therefore, the bending due to thermal stress is $z^{pimax}$=1.39×10$^{-10}$ cm. In order to estimate the bending due to the photoinduced stress we assume the quantum efficiency $\eta$=1 and that the charge carriers are uniformly distributed. Then, the carrier number density is $\Delta$n=8.936×10$^{13}$ cm$^{-3}$. Using $d\epsilon_g/dP$=−2.9×10$^{-24}$ cm$^3$ for SI we get $z^{pimax}$=5.19×10$^{-10}$ cm which is about 3.7 times larger than the bending due to thermal stress for the same power.

The bending can be observed in numerous ways: Optical readout; capacitance; piezo-resistivity; and electron tunneling. Hoh et al. [J. Am. Chem. Soc. 114, 4917 (1992)] and Ohnesorge et al. [*Science*, 260, 1451 (1993)] have reported the measurement of cantilever bending as small as 5×10$^{-12}$ m.

FIG. 1 shows the separate response to photogenerated charge carrier and thermal effects for a silicon microcantilever coated on one surface with aluminum and exposed to pulsed photons with $\lambda$=780 nm having an absorbed power of 3.9 nW. Curve (a) represents the observed deflection when the signal was modulated as indicated by the squared plot (b). Curve (c) represents the deflection resulting from thermal effects. In the system shown, the thermal effects may be characterized as noise.

Figure 2:
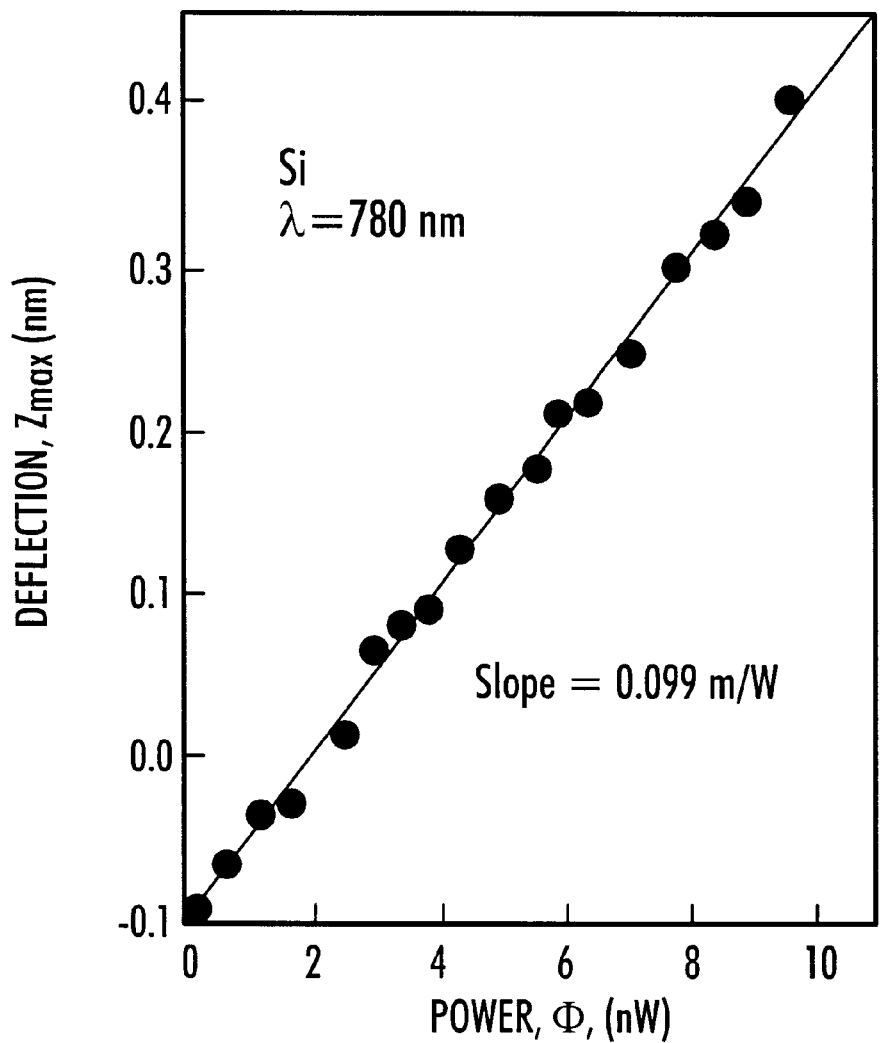
FIG. 2 is a plot of deflection distance versus power for a silicon microcantilever irradiated at 780 nm.

Microcantilever bending due to photoinduced stress has been found to be a function of absorbed power. FIG. 2 illustrates the bending of a Si microcantilever as a function of absorbed power using a fixed wavelength (780 nm) emitted from a diode laser. The deflection is due primarily to photoinduced stress. The deflection increases linearly with increasing power.

Figure 3:
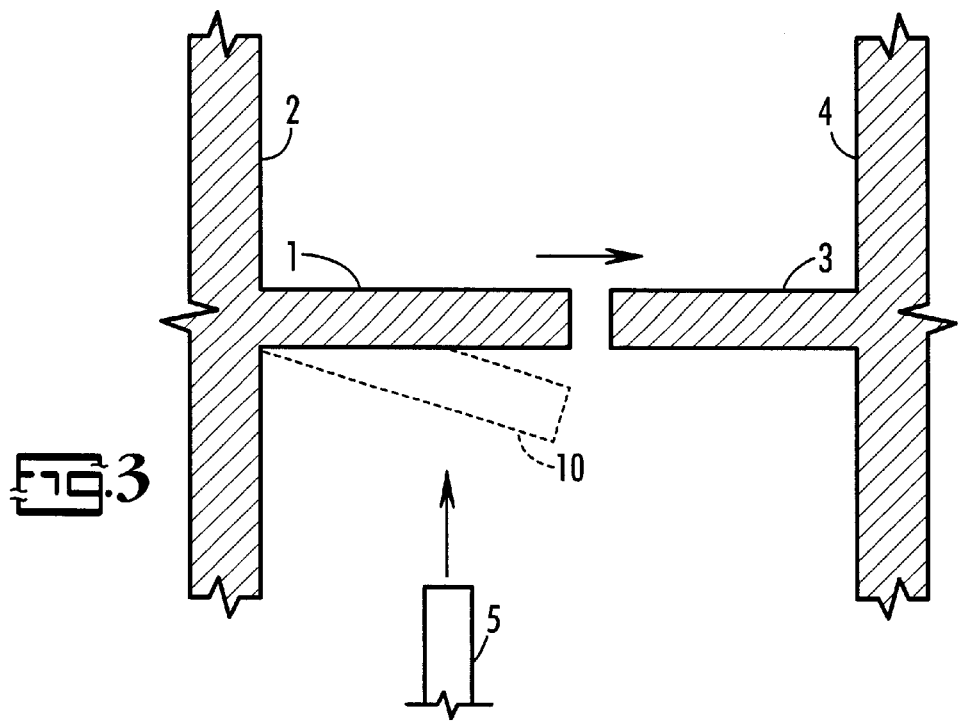
FIG. 3 is a diagrammatic representation of an on/off switch according to this invention.

The phenomenon described supra may be used to fabricate an optical switch. In a first embodiment, as shown in FIG. 3, a simple modulation or on/off switch is illustrated. A Si cantilever 1 attached to a base 2 is juxtaposed to a second cantilever 3 attached to base 4. The relative lengths of 1 and 3 are not material so long as cantilever 1 is long enough to be deflected a sufficient distance so as to point away from the tip of cantilever 3 when irradiated with photons of appropriate wavelengths from diode laser 5. The tips of cantilevers 1 and 3 should be as close as possible, allowing for the avoidance of contact during bending of cantilever 1 to position 10. It is noted that the cantilever 3 need not be a semiconductor material but any compatible carrier for the frequency used. Cantilever 3 need not be of any particular length and need not extend beyond base 4. The Figure is illustrative of the concept only.

The cantilevers may be formed from Si and other semiconductor materials such as the Group III-V materials conventionally used in computer chips. Doping is not required but is allowed. To make them serve as an optical waveguide it is necessary only to ensure that the carrier wavelength passed through the waveguide must be longer than the band gap wavelength and is preferably 1.3 to 1.55 um characteristic of optic fiber light pipes.

The cantilever may be optically coupled to a light source such as an optic fiber using traditional integrated fiber optic techniques. It is not necessary to provide an additional coating to use the cantilever. An optic fiber may be dropped or inserted into an etched groove formed in the base of the cantilever. Typically, it is necessary only to etch to a depth equivalent to one-half of the diameter of the fiber.

When the cantilever is directed to a tip such as that of second cantilever 3, there is minimal loss of intensity across the gap if the tips are close butted to achieve field interaction at the gap. If the distances are unavoidably greater, efficiency may be increased by fabricating subwavelength structures at the tip. Losses as great as 6 dB can be compensated for in this manner. Interference from background light is minimal because the device is easily enclosed in a "black box."

When the cantilevers serve as waveguides only minimal heating results, which may be minimized by the use of heat sinks attached to bases 2 and 4. So long as laser diode 5 is off, the switch is in the connected position (on) and functions as a conventional waveguide or light pipe. When laser diode 5 is activated to produce a light beam having a wavelength shorter than the band gap, the cantilever 1 bends to take position 10, and the light emitted from the tip of one cantilever is no longer aimed into the end of the other cantilever. The switch is disengaged (off). [This example is based upon the use of Si or another material having a negative pressure dependence. The reverse movement occurs if the sign is positive].

The light source used in accordance with this invention may be any available laser diode generating a beam of photons at the wavelength necessary to generate stress in the microcantilever through mobilization of charge carriers. The laser diode may be formed on a chip in the region of the microcantilever. Alternatively, it may be externally mounted and the output piped into the desired location using an optic fiber. The choice is primarily a packaging issue.

Figure 4:
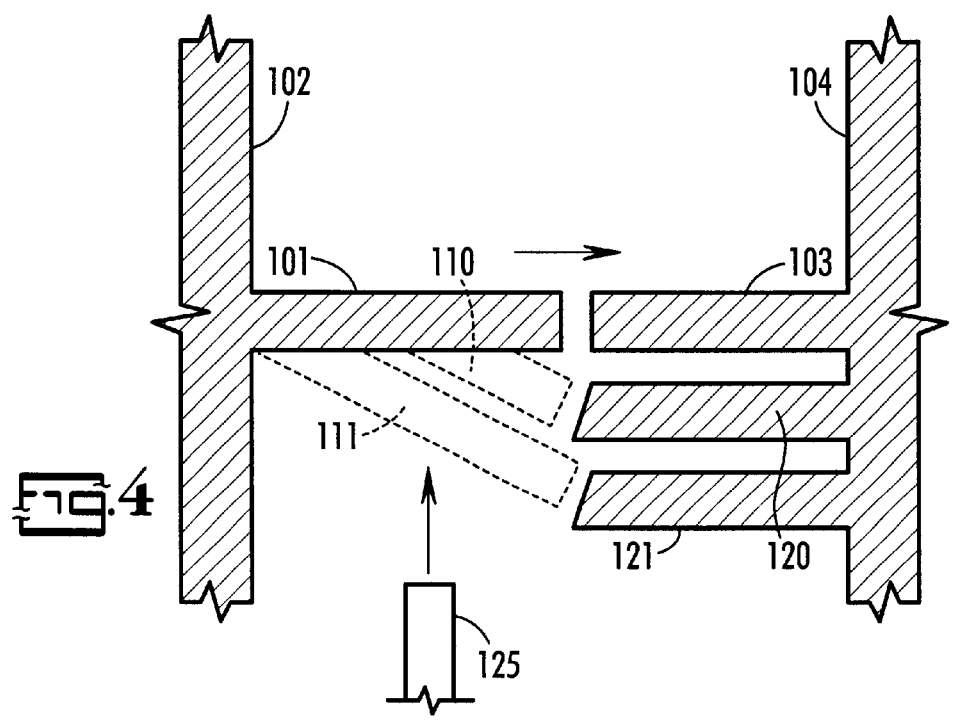
FIG. 4 is a diagrammatic representation of a multi-channel optical switch according to this invention.

The effect illustrated in FIG. 2 may be used to effect multichannel switching as illustrated in FIG. 4 Cantilever 101 and base 102 conform to elements 1 and 2 of FIG. 3. Cantilever 103 and base 104 generally conform to elements 3 and 4 of FIG. 3. Additionally, attached to base 104 are cantilevers 120 and 121 which are also waveguides. When cantilever 101 is irradiated by photodiode 125, the cantilever will deflect to position 110 or 111 depending upon the power output of the photodiode. In the latter positions, the cantilever will be juxtaposed to cantilevers 120 or 121 and light will pass to one of the alternative waveguides (note that in the preferred embodiment, the tips of waveguide 120 and 121 are beveled slightly for better alignment).

The result is a multichannel switch which can assume any of the desired positions at the response time of the microcantilevers.

The ease with which a microcantilever can be coated on one side provides additional advantages to this invention. A coated microcantilever acts as a bimetallic element. When $d\epsilon_g/dP$ is positive, the photoinduced stress and thermal stress work in the same direction. When $d\epsilon_g/dP$ is negative, photoinduced stress and thermal stress work in opposition directions, an effect which renders the device more tuneable. In addition to Si, GaAs also has a negative $d\epsilon_g/dP$. Gold is an easily manipulated material for coating and is preferred. By switching frequencies to above and below the band gap energies, the device of FIG. 4 may be moved above or below position 101. Such is the case for a Si microcantilever coated with Al.

The microcantilever may be tuned further by the use of very different semiconductor materials at adjacent locations to avoid interference when closely packed. For example, Si:In has a cut off wavelength of about 8 μm whereas Si:Ga and Si:As have cutoff wavelengths of 19 μm and 23 μm respectively. Proper selection of semiconductor materials allows for a more densely packed device.

As can be understood from this description, an optical switch using micro-mechanical beams as the switched element is limited in size only by the size of the microcantilever itself. The low mass of the micro-mechanical beam and its rapid response to impinging photons allows very high switching rates. There is no electronic noise generated at the switching site and shielding needs are minimal. The low mass of the device and the ease of heat sinking the switch means that external cooling is not a factor and allows easy scale up.

The invention will be further described by reference to the following examples, which are illustrative only and do not limit the invention. Modification and additions as would be apparent to one skilled in this art are subsumed within the scope of this disclosure.

EXAMPLE I

A polycrystalline silicon microcantilever device having nominal dimensions (e,w,t) of 400 μm, 30 μm and 2 μm was obtained from Park Scientific Instruments, (Sunnyvale, Calif.). A v-groove may be formed on the top surface of the base of the device by first masking the surface and etching. A coating of aluminum may be applied to one side by sputtering. A commercially available optic fibre having a nominal diameter of 125 μm may be inserted into the v-groove and secured with an adhesive.

A second microcantilever may be prepared in the same manner.

The microcantilevers may be mounted on chip holders designed for atomic force microscopy. A laser diode emitting photons at 780 nm may be mounted beneath the first microcantilever. The optic fiber attached to the first microcantilever may be connected to a light source emitting at 1550 or 1300 nm. The optic fiber mounted on the second microcantilever may be connected to a laser diode. The device should be shielded in the region of the microcantilevers and the light source may be turned on. The light may be detected at the photodetector. The 780 nm diode laser may be pulsed and the pulsations matched to the on/off cycle observed at the photodetector.

EXAMPLE 2

A multichannel switch may be demonstrated by fabricating a third microcantilever in the same fashion as the second microcantilever in Example 1. The third microcantilever may be mounted 180° to the second microcantilever (i.e. in the direction of bending of the 1st microcantilever) and connected to a second photodetector. The power to the photodiode may be adjusted to focus the first microcantilever on the tip of the third microcantilever. The photodiode may then be cycled to focus alternately on the tips of the second and third microcantilevers and the respective signals observed.

We claim:

1. A optical switch comprising:

a) a first waveguide formed from a semiconductor material in the shape of a cantilever spring element;

b) at least one second waveguide transparent to frequencies to which said first waveguide is transparent;

c) at least one light source capable of emitting light in the direction of said first waveguide at a wavelength shorter than the band gap wavelength of the semiconductor material of said first waveguide;

d) means for introducing a carrier light signal into said first waveguide at a wavelength longer than the band gap wavelength of said first waveguide semiconductor material, and e) means for switching on said light source.

2. An optical switch according to claim 1 wherein said first waveguide is formed from a semiconductor material having a negative pressure dependence of the band gap energy.

3. An optical switch according to claim 2 wherein the semiconductor material is polycrystalline silicon.

4. An optical switch according to claim 2 wherein the semiconductor material is Ga:As.

5. An optical switch according to claim 1 wherein the power of said light source is stepwise adjustable.

6. An optical switch according to claim 1 wherein said first waveguide is coated with a reflective metal on a side opposite to at least one light source.

7. An optical switch according to claim 1 wherein said at least one second waveguide is a microcantilever formed from a semiconductor.

8. An optical switch according to claim 1 wherein said at least one second waveguide is an optical fiber which is not formed from a semiconductor material.

9. An optical switch according to claim 1 wherein said light source emits light in the direction of said first waveguide through an optical fiber.

10. An optical switch according to claim 5, wherein said light source is a laser diode.

11. A switch array comprising a plurality of optical switches according to claim 1.

* * * * *